May 2, 1967     KAZUO SATO ET AL     3,317,701

TUBULAR ELECTRIC ELEMENT MANUFACTURING APPARATUS

Filed Sept. 8, 1964     4 Sheets-Sheet 1

INVENTORS
Kazuo Sato
Takashi Karasawa
Tokuji Fukazawa
Eiji Sekiya and
Tokushige Sato BY Wenderoth, Lind & Ponack

ATTORNEYS

INVENTORS
Kazuo Sato
Takashi Karasawa
Tokuji Fukazawa
Eiji Sekiya and
Tokushige Sato
BY Wenderoth, Lind and Ponack
ATTORNEYS

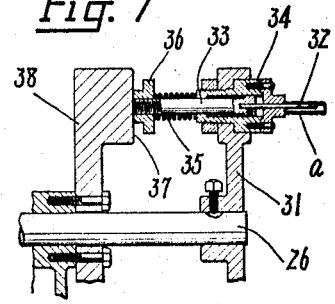
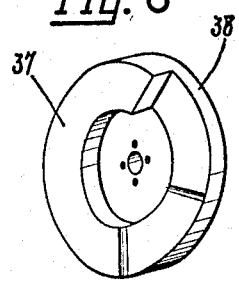
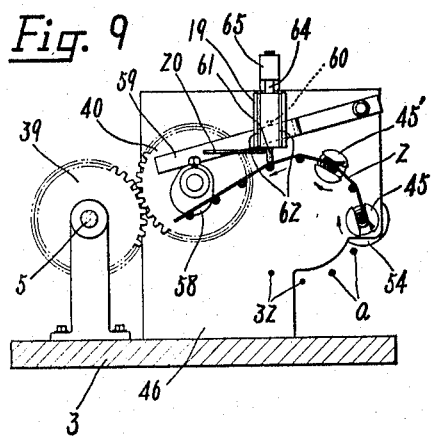
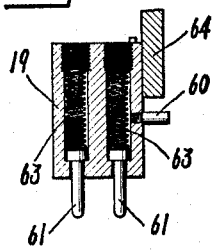
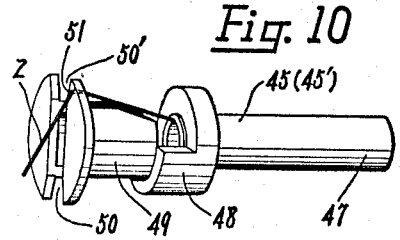

United States Patent Office 3,317,701
Patented May 2, 1967

3,317,701
**TUBULAR ELECTRIC ELEMENT MANUFAC-
TURING APPARATUS**
Kazuo Sato and Takashi Karasawa, Harunamachi, Tokuji
Fukazawa, Mamachi, and Eiji Sekiya and Tokushige
Sato, Harunamachi, Japan, assignors to Taiyo Yuden
Company, Limited, Tokyo, Japan, a limited-liability
company of Japan
Filed Sept. 8, 1964, Ser. No. 394,700
Claims priority, application Japan, Dec. 27, 1963,
38/70,653
5 Claims. (Cl. 219—56)

This invention relates to tubular electric element manufacturing apparatus, particularly to apparatus for winding and soldering a lead wire or wires on a great number of tubular electric elements.

The chief object of the invention is to provide an automatic apparatus for winding and soldering a lead wire or wires on a great number of tubular electric elements, for example miniature cylindrical condenser elements, thereby facilitating a mass production of tubular electric elements such as miniature cylindrical condensers.

A tubular electric element manufacturing apparatus according to the invention comprises an intermittently revolving disk having a great number of projecting rods for respectively holding tubular electric elements, which rods are circularly and retirably fixed to said disk, a lead wire winder or winders which are revolved to wind a lead wire or wires on said element or elements per each stopping time of the intermittent revolution of said disk, an electric welder which is adapted to solder the lead wire wound portion of said element or elements, and a stationary cam disk, an annular cam surface of which contacts retirable means supporting said rods.

The more specific features and advantages will become apparent from a consideration of the following description.

In the accompanying drawings:

FIG. 7 is an enlarged sectional left side view of a part of said apparatus;

FIG. 8 is an enlarged perspective view of a cam disk;

FIG. 9 is a sectional back view of a part of said apparatus taken along line D—D of FIG. 1;

FIG. 10 is an enlarged perspective view of a lead wire winder;

FIG. 11 is an enlarged sectional front view of an electric welder;

Like characters of reference show corresponding parts throughout the views.

Figure 13:
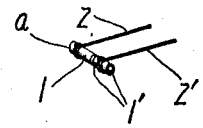
FIG. 13 is a similar view of one of said condensers.

In this embodiment of the invention a great number of cylindrical condenser elements $a$ (FIG. 13), each of which consists of a cylindrical dielectric body coated with two thin electrodes 1 and 1' on its both surfaces, are successively wound with two lead wires 2 and 2' on their both electrode end portions and soldered thereon, thereby producing a series of the required cylindrical condensers as shown in FIG. 13.

Figure 1:
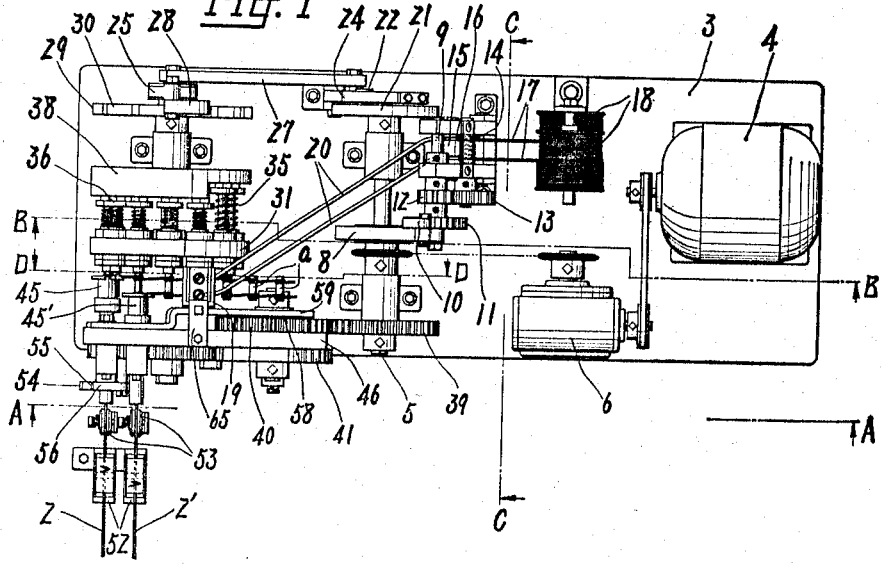
FIG. 1 is a plan view of a tubular electric element manufacturing apparatus according to the invention.
Figure 3:
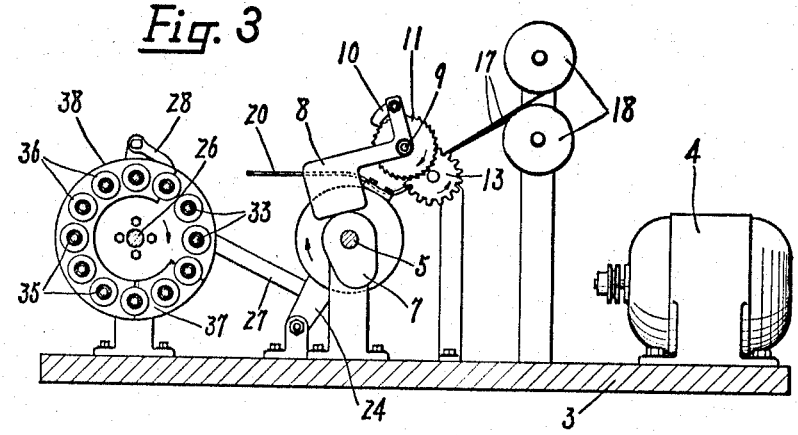
FIG. 3 is a similar view of the above taken along line B—B of FIG. 1.

Referring to FIG. 1, 3 denotes a base, on which an electric motor 4 is rigidly fixed. By said motor a driving shaft 5 is revolved in the left hand direction through a reduction gear 6. Secured to said shaft is a cam 7 (FIG. 3) engaging one end of a Z-shaped rocking member 8, which is pivoted at its elbow portion on a shaft 9, the other end of said member being provided with a pawl 10 engaging a ratchet wheel 11 secured to said shaft, whereby said shaft is intermittently revolved in the right hand direction by the driving shaft 5.

Figure 6:
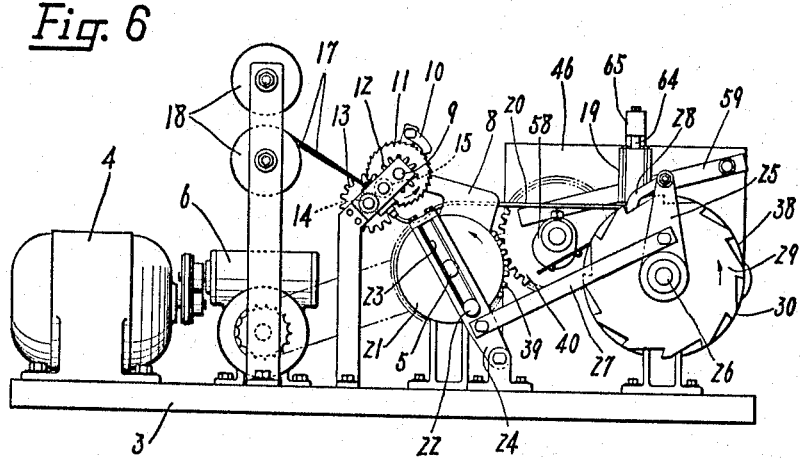
FIG. 6 is a back view of said apparatus.
Figure 5:
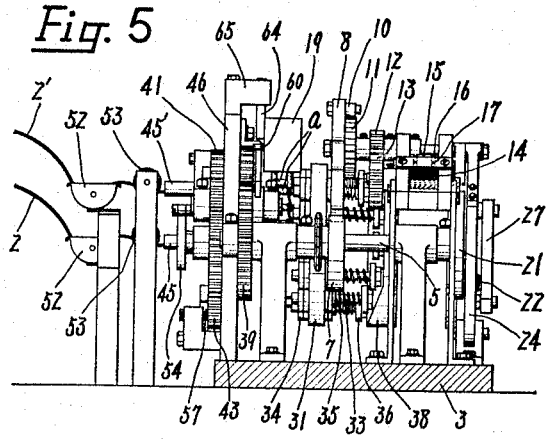
FIG. 5 is a sectional right side view of said apparatus taken along line C—C of FIG. 1.

As shown in FIG. 6, secured to the shaft 9 is a gear wheel 12 engaging a gear wheel 13, with which a friction roll 14 is coaxially connected, said roll engaging another roll 15 having two parallel annular grooves 16 (FIGS. 1 and 5). Passing between said friction roll and said two grooves two string solders 17 are respectively fed by said friction roll from solder reels 18 to an electric welder 19 passing through smooth guide pipes 20.

Secured to the driving shaft 5 is a disk 21 having a pin 22 near its periphery (FIG. 6), said pin engaging a slot 23 formed in a rocking bar 24, the lower end of which is pivoted on the base 3. The lower portion of said bar is connected to a rocking arm 25, which is pivoted on a rotatable shaft 26, through a link 27. Attached to the free end of said arm is a pawl 28 engaging a ratchet wheel 29 which has twelve teeth 30 and is secured to said rotatable shaft. Thus said rotatable shaft is revolved intermittently, namely by one tooth of said ratchet wheel per each revolution of the driving shaft 5.

Fixedly mounted on the rotatable shaft 26 is a big disk 31 which is provided with twelve projecting rods 32 (FIG. 2) for respectively holding the cylindrical condenser elements $a$ corresponding to the twelve teeth 30 of the ratchet wheel 29, said rods being disposed horizontally and circularly at equal intervals near the periphery of said disk. As shown in FIG. 7 each of said rods is rigidly fixed to a piston member 33 which engages a cylinder member 34 secured to the big disk 31 and projects in the opposite direction relative to said rod, and a helical compression spring 35 is installed around said piston member and between said cylinder member and a nut 36 attached to the free end of said piston member.

The end nuts 36 of the piston members 33 are pressed to an annular cam surface 37 of a stationary cam disk 38 which is so formed as shown in FIG. 8 and secured to the base 3, but loosely mounted on the rotatable shaft 26.

A gear wheel 39 (FIGS. 1 and 2) secured to the driving shaft 5 engages a gear wheel 40, with which a partly toothed wheel 41 is coaxially connected, the latter engaging a gear wheel 42 through two idle wheels 43. Further the gear wheel 42 engages two small gear wheels 44 and 44', which are fixedly mounted on lead wire winders 45 and 45', respectively, the latter being horizontally supported by a vertical frame 46. Thus said lead wire winders are adapted to revolve twice per each stopping time of the intermittent revolution of the big disk 31 having the element holding rods 32.

Figure 4:
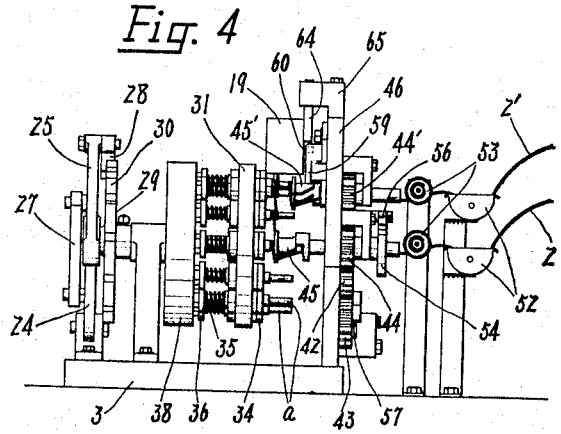
FIG. 4 is a left side view of said apparatus.

Each of the lead wire winders 45 and 45' is of tubular form as shown in FIG. 10, and consists of a comparatively long cylindrical part 47, a partly cut flange part 48 and a pin shaped part 49, slots 50 and 50' being made on the head and stem, respectively, of said pin shaped part for permitting the element $a$ held by the rod 32 to enter therein, and a hole 51 being made in said head for passing the lead wire 2 or 2'. As shown in FIGS. 1 and 4 the winder 45 is so positioned to permit the most part of the element $a$ to enter therein, and the winder 45' so positioned to permit the top end of said element to enter therein.

The lead wires 2 and 2' are respectively led out of the holes 51 passing through the winders 45 and 45', sag removing means 52 and refining liquid containers 53 from lead wire reels (not shown).

Secured to the cylindrical part 47 of the winder 45 is a deformed disk 54 having a stopper 55 on its periphery (FIG. 2), which stopper engages a pawl 56, whereby said winder as well as the winder 45' are kept from reversal. 57 (FIGS. 2 and 5) indicates a spring pressing the side surface of one of the idle wheels 43 in order of keeping a series of the gear wheels from vibration.

As shown in FIGS. 6 and 9, secured to the shaft of the gear wheel 40 is a cam 58 engaging a rocking lever 59 pivoted on the vertical frame 46, said lever engaging also a lateral projection 60 of the electric welder 19. Said welder is provided with two vertical soldering bits 61, which are heated by electric heaters 62 and respectively pressed down by helical springs 63, and also provided with a vertical rectangular bar 64 which slidably passes through a guide arm 65 rigidly fixed to the frame 46. Thus the electric welder 19 is moved up and down by the rocking lever 59 engaging the cam 58 which is revolved by the driving shaft 5.

The apparatus according to the invention is thus constructed and its operation is as follows:

The cylindrical condenser raw elements *a* were respectively put on the projecting rods 32 fixed to the big disk 31, and the lead wires 2 and 2' passing through each hole 51 of the lead wire winders 45, 45', respectively, are manually wound on the top end portion of the first element *a* and on the bottom end portion of the third element *a*.

When the motor 4 is energized, the driving shaft 5 is revolved in the right hand direction by said motor (FIG. 1), and the rocking member 8 is moved up and down by the cam 7 (FIG. 3), revolving the ratchet wheel 11 intermittently in the right hand direction by the pawl 10. Then, through the gear wheels 12 and 13 the friction roll 14 is revolved in the right hand direction (FIG. 6), thereby intermittently feeding the string solders 17 from the solder reels 18 to the electric welder 19 through the grooves 16 of the guide roll 15.

On the other hand the disk 21 is revolved in the left hand direction by the driving shaft 5 (FIG. 6), moving the rocking bar 24 right and left by the pin 22 engaging the slot 23, then the rocking arm 25 is moved right and left by said bar through the connecting link 27, revolving the ratchet wheel 29 and the rotative shaft 26 in the left hand direction by one tooth 30 per each revolution of the driving shaft 5 by the pawl 28.

Figure 2:
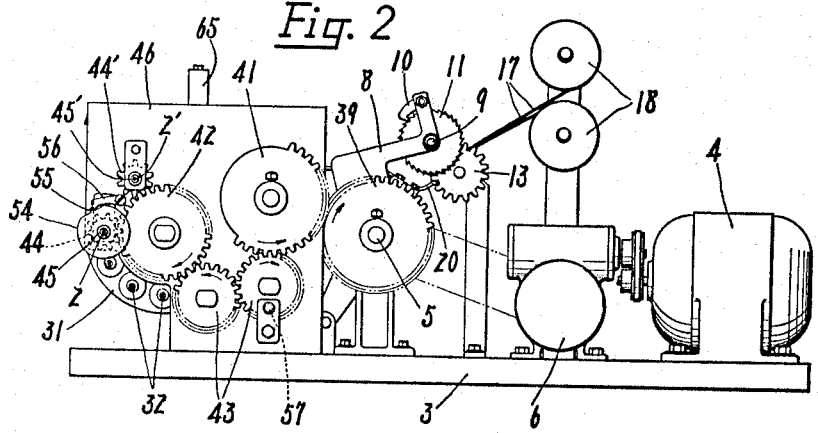
FIG. 2 is a sectional front view of said apparatus taken along line A—A of FIG. 1.

As shown in FIGS. 1 and 2 the partly toothed wheel 41 is simultaneously revolved by said driving shaft through the gear wheels 39 and 40, and the two small gear wheels 44 and 44' together with the lead wire winders 45 and 45' are revolved twice in the left hand direction by said partly toothed wheel through the gear wheels 43 and 42 per each stopping time of the intermittently revolving big disk 31, then the lead wires 2 and 2' are respectively wound twice on the bottom end portion of the backward element *a* and on the top end portion of the forward element *a*.

The lead wire wound elements are separated from said winders and sent to the electric welder 19 by the big disk 31 (FIG. 9), where the lead wire wound portions of each element are respectively soldered by the soldering bits 61, with which the intermittently fed string solders 17 just contact and are melted.

After the soldering the end nut 36 corresponding to the projecting rod 32 holding said lead wire wound and soldered element falls down from the highest portion of the cam surface 37 of the cam disk 38 (FIGS. 7 and 8), then the corresponding piston member 33 moves outwards under influence of the spring 35 pulling in said projecting rod, thereby releasing said element.

Figure 12:
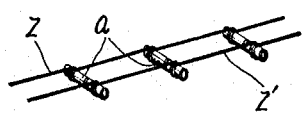
FIG. 12 is an enlarged perspective view of a series of cylindrical condensers.

Thus a series of the lead wire wound and soldered elements *a*, which are connected together by the lead wires 2 and 2' (FIG. 12) are produced, and the required cylindrical condenser is obtained by cutting said lead wires as shown in FIG. 13.

In this embodiment each of the condenser elements *a* is wound with the lead wires 2 and 2' at its both end portions and soldered thereon, however said condenser elements may be replaced by resistor raw elements, each of which consists of a cylindrical insulating body coated with a resistance film, or others. Moreover, if necessary, each of such elements may be wound with a single lead wire at its arbitrary portion by using one of the winders 45 and 45' and soldered thereon.

Without further description it is thought the features and advantages of the invention will be readily apparent that changes in the form, proportion and minor details of construction may be resorted to, without departing from the spirit of the invention or the scope of the appended claims.

What we claim is:

1. An apparatus for automatically winding lead wires onto a cylindrical electric element and soldering said lead wires, said apparatus comprising a rotatable disc having a plurality of electric element holding members around the periphery thereof, said holding members being adapted to hold a cylindrical electric element and being reciprocally mounted in said disc for reciprocal movement parallel to the axis of rotation of said disc, disc rotating means coupled to said disc for intermittently rotating said disc, at least one lead wire winding means positioned adjacent said disc at a point at which one of the holding members is stopped during the periods between the intermittent rotations of said disc for winding at least one lead wire around an electric element which is stopped at said point, an electric welding means positioned adjacent said disc at a point at which one of the holding members is stopped during the periods between intermittent rotations of said disc, said last mentioned point being past said first mentioned point in the direction of rotation of said disc, and a stationary cam disc on the opposite side of said disc from said lead wire winding means and said welding means and having an annular cam surface with which said holding members are in contact for moving said holding members in the direction of said lead wire winding means and said welding means and retracting said holding members when said holding members move past the position of said welding means.

2. An apparatus as claimed in claim 1 in which said holding members are spring loaded toward said stationary cam disc so that they remain in contact with said cam disc during rotation of said rotatable disc.

3. An apparatus as claimed in claim 1 in which there are a plurality of said lead wire winding means, said electric welding means being past the last of said welding means in the direction of rotation of said rotatable disc, said welding means having a plurality of welding heads corresponding in number to the number of lead wire winding means and positioned for welding the respective lead wires wound on the electric element by said lead wire winding means.

4. An apparatus as claimed in claim 1 in which said electric welding means includes solder feed means coupled to said disc rotating means for feeding solder to said electric welding means at each rotational movement of said rotatable disc.

5. An apparatus as claimed in claim 1 in which said electric welding means is movable transversely of the path of said electric elements moved by said rotatable disc and includes moving means coupled to said disc rotating means for reciprocally moving said welding means in the transverse direction at each intermittent movement of said rotatable disc.

References Cited by the Examiner

UNITED STATES PATENTS 2,666,120  1/1954  Chanowitz _____ 219—91 X
2,736,343  2/1956  Sidorowicz _____ 140—71.5

RICHARD M. WOOD, *Primary Examiner.*

JOSEPH V. TRUHE, B. A. STEIN,
*Assistant Examiners.*